United States Patent Office 3,308,372
Patented Mar. 7, 1967

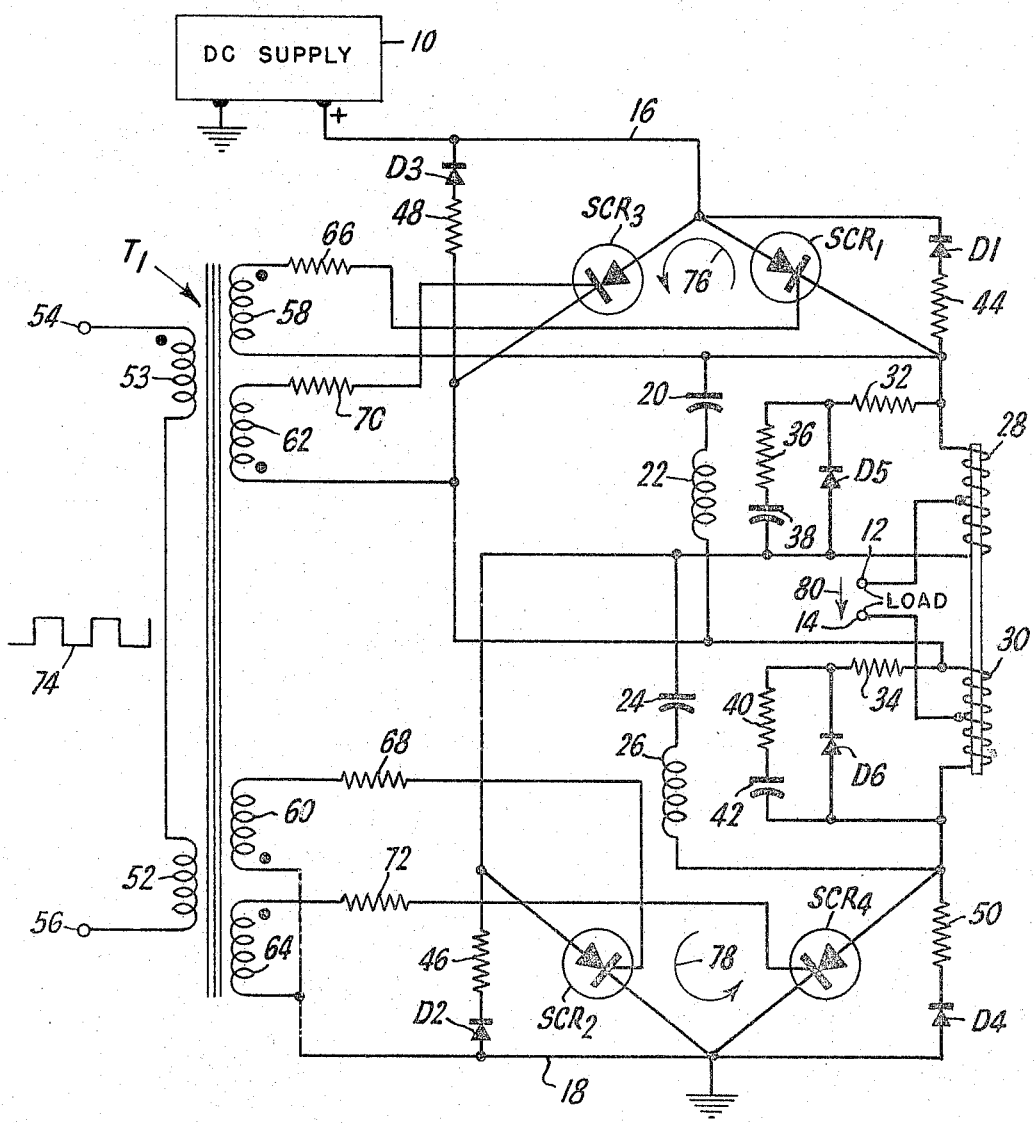

---

3,308,372
BRIDGE TYPE STATIC INVERTER NETWORK
Robert Kimball Young, Danbury, and James Joseph Duffy, Stamford, Conn., assignors to American Machine & Foundry Company, a corporation of New Jersey
Filed Oct. 22, 1963, Ser. No. 318,048
7 Claims. (Cl. 321—45)

This invention relates to an electrical converter wherein direct current power is converted to alternating current power, and more particularly to a highly efficient, reliable static inverter for converting direct current to alternating current at high power levels and under highly inductive load conditions.

In many applications it is necessary to convert direct current to alternating current at high power levels wherein the load is highly inductive. For example, it is desirable to be able to control the speed of an electric motor of large horse-power by varying the frequency of the alternating current supplied thereto. A static inverter is theoretically well suited for such an application as its output frequency is easily varied by simply varying the frequency of the usual driving oscillator for such an inverter. However, in practice, the large transient voltages developed by a heavy inductive load during switching of A.C. half-cycles often exceed the design ratings of the semiconductor components utilized to carry the switching load, resulting in sudden failures thereof.

Another problem in attempting to use static inverters to control large inductive loads arises when silicon controlled rectifiers are used as the switching elements. The commutation currents resulting from the large stored energy of the load cause the silicon controlled rectifiers to be reverse biased for various periods of their normal conduction cycle, thus resulting in erratic operation.

Accordingly, it is a broad object of the present invention to provide an improved high power static inverter.

A more specific object of the invention is to provide a static inverter employing controlled rectifier switching elements which is capable of reliable operation with a highly inductive load of large magnitude and under widely varying frequency conditions.

It is another object of the invention to provide a static inverter for delivering power at high levels to a large inductive load wherein the danger of damage to the inverter switching elements due to transient voltages developed by the inductive load is eliminated.

The specific nature of the invention, as well as other advantages, uses and objects thereof, will clearly appear from the following description and the accompanying drawing in which is shown a circuit diagram of an embodiment of a static inverter in accordance with the invention.

Referring now to the drawing, a D.C. power supply 10 provides direct current power which is to be converted into alternating current power of predetermined frequency by operation of controlled rectifiers SCR1, SCR2, SCR3, SCR4, which may be of the "silicon" type. These rectifiers are generally connected in a bridge configuration and deliver alternating current power to a load such as an electric motor, connected to the terminals 12 and 14. While the present invention is quite suitable for energizing resistive loads, it is particularly adapted to supply power to inductive loads such as large horsepower motors. In one practical application of three of the herein described preferred embodiments of the invention arranged to supply three phase power output, a power capability of 40 kva. was provided.

The positive terminal of D.C. supply 10 is connected to a line 16 while the negative terminal is connected through a ground connection to line 18. The anode terminals of rectifiers SCR1, SCR3, are commonly connected to line 16 whereas the cathode terminals of rectifiers SCR2, SCR4 are connected to line 18. A commutating capacitor 20 for rectifiers SCR1, SCR3 is connected in series with an air-core inductance 22 across the cathode terminals of rectifiers SCR1, SCR3. Likewise, a commutating capacitor 24 for rectifiers SCR2, SCR4 is connected in series with an air-core inductance 26 across the anode terminals of rectifiers SCR2, SCR4.

The cathode terminal of rectifier SCR1 is connected to the anode terminal of rectifier SCR2 to complete one side of the bridge circuit, by means of a center tapped iron-core inductance 28. The cathode terminal of rectifier SCR3 is connected to the anode terminal of rectifier SCR4 by means of a center tapped iron-core inductance 30 which connects the sides of the bridge together. Connected to the center taps of inductances 28 and 30 are the load terminals 12 and 14 to which an inductive load may be connected if desired. A diode D5 is serially connected with a resistor 32 across the terminals of inductance 28. Likewise, a diode D6 is serially connected with a resistor 34 across the terminals of inductance 30. Connected in parallel with diode D5 are serially connected resistor 36 and a capacitor 38. Connected in parallel with diode D6 are serially connected resistor 40 and a capacitor 42.

A diode D1 and a resistor 44 are connected in series across the anode and cathode terminals of rectifier SCR1. A diode D2 and resistor 46 are serially connected across the anode and cathode terminals of rectifier SCR2. Likewise, a diode D3 and resistor 48 are serially connected across the anode and cathode terminals of SCR3 and a diode D4 and resistor 50 are serially connected across the anode and cathode terminals of SCR4.

Triggering voltage of a selected frequency for selectively switching the controlled rectifiers in accordance with such frequency is provided by a transformer T1 which has input windings 53, 52 serially connected to input terminals 54, 56. Transformer T1 has four output windings 58, 60, 62, 64, which each have a terminal connected through respective resistors 66, 68, 70, 72 to the gating terminals of controlled rectifiers SCR1, SCR2, SCR3, SCR4 respectively. The other terminals of each of windings 58–64 are connected to the cathode terminals of their respectively associated controlled rectifiers.

The operation of the inverter and the function of the components identified above will now be described. In order to obtain proper operation of the inverter of present invention, a control signal of selected frequency should be preferably square wave in form, as indicated by reference numeral 74. This signal may be variable in frequency and is supplied from a suitable source of A.C. control voltage which is adapted to generate square waves. In practice, it has been found that the inverter of the present invention is capable of operating satisfactorily over a 6 to 1 frequency range. The operating frequency will depend upon the choice of component values. In one embodiment of the invention, the frequency range covered 40 to 240 cycles.

The function of transformer T1 is to selectively turn On pairs of controlled rectifiers SCR1 and SCR4, or SCR2 and SCR3, according to the polarity of the input signal. Thus, in accordance with the usual "dot" nomenclature to indicate transformer polarity, when the input signal 74 applied to terminals 54 and 56 is positive with respect to terminal 54, a signal will appear across the terminals of output windings 58 and 64 with the dotted ends thereof having a positive polarity. This signal is fed to the gate terminals of controlled rectifiers SCR1 and SCR4, thereby placing them in a "turn-On" condition. Conversely, when terminal 56 of transformer T1 has a positive polarity, the undotted terminals of output windings 60 and 62 will be positive with the result that controlled rectifiers SCR2 and SCR3 will be in a "turn-On" condition, whereas rectifiers SCR1 and SCR4 will be turned Off.

Assume for purposes of illustration, that controlled rectifiers SCR1 and SCR4 are "turned-On." A closed D.C. path from line 16 to line 18 will then be provided through the load connected to terminals 12 and 14 by means of a circuit comprising controlled rectifier SCR1, the upper portion of inductance 28, through the load connected to terminals 12 and 14, the lower portion of inductance 30, and through controlled rectifier SCR4 to line 18. Capacitors 20 and 24 will also be charged as it will be seen that when controlled rectifiers SCR1 and SCR4 are in an On condition, these capacitors also have circuit connections to lines 16 and 18.

A short time later in the A.C. cycle, controlled rectifiers SCR2, SCR3 are turned On by reversal of the polarity of input signal 74, so that at a given instance all of the controlled rectifiers are in an On condition. Because of the nature of the operation of a controlled rectifier, rectifiers SCR1, SCR4 cannot be turned Off until the polarity of the voltage across their respective anodes and cathodes is reversed.

As soon as rectifiers SCR2, SCR3 conduct, then capacitors 20, 24 are discharged in the direction shown by circular arrows 76, 78. These capacitors are electrically isolated from each other by means of iron-core inductances or chokes 28, 30, which present a high impedance to the flow of discharge current therethrough from capacitors 20, 24. For reasons which will be explained hereinafter, inductances 28, 30, are both wound on a common core.

Discharge of capacitors 20, 24 causes a reverse current to flow through controlled rectifier SCR1 and forward current through controlled rectifier SCR3 which was just turned On. Likewise, a reverse current will flow through controlled rectifier SCR4 and a forward current through SCR2. The reverse current continues to flow until the impedance of rectifiers SCR1 and SCR4 rises to a high value, and the rectifiers are cutoff. As the voltage applied to the control electrodes of rectifiers SCR1, SCR4 has a negative polarity at this instant, with respect to their cathodes, these rectifiers will remain in a cutoff condition. A trait of semiconductor controlled rectifiers is that a certain recovery period, depending on the characteristics of the rectifier, must occur before they can block conduction in the forward direction, otherwise they will break down and possibly fail. As the duration of the "shutoff" time is a function of the size of capacitors 20, 24, these capacitors must be sufficiently large to maintain a reverse voltage on controlled rectifiers SCR1, SCR4 long enough to allow them to recover and thus remain in a cutoff condition.

Inductors 22, 26 are of the air-core type and are placed in series with capacitors 20, 24 for the purpose of acting as impedances to limit the rate of rise of the current generated by the discharge of capacitors 20, 24. By limiting this rate of rise, the peak forward and reverse values of current in controlled rectifiers SCR1, SCR4, as the case may be, is prevented from being exceeded.

In the manner just described, controlled rectifiers SCR2, SCR3 are now in an On condition, whereas controlled rectifiers SCR1, SCR4 are now in an Off condition. However, this action will not change the flow of current through large inductive loads such as the field of an electric motor, which may require tenths of a second to change its field current direction, whereas the switching time of controlled rectifiers occurs in a matter of microseconds. The current in the inductive load will therefore continue in the direction shown by arrow 80 and will generate a self induced voltage across terminals 12 and 14. For the example given, terminal 14 will assume a positive transient potential with respect to terminal 12, causing diodes D2, D5, D6, and D3 to conduct. The current through the load will therefore follow the circuit paths now completed by these diodes.

Thus, starting with negative line 18, the load current will flow through diode D2 and resistor 46; through diode D5 and resistor 32; through the upper half of the coil winding of inductance 28; through the load connected to terminals 12, 14; through the lower half of the coil winding of inductance 30; through diode D6 and resistor 34; and through resistor 48 and diode D3 to positive line 16. It will be seen that alternate paths have now been provided which allow the load current to continue to flow in the same direction as before as long as the transient voltage developed by the collapsing field of the inductive load is greater than the D.C. supply voltage. Diodes D5, and D6, when conducting, allow the decreasing load current to continue to flow in the same direction as before through the same winding of inductances 28, 30. Development of a high peak inverse voltage across rectifiers SCR2, SCR3, which would occur if the load current were suddenly required to flow through the remainder of windings 28, 30, is thereby prevented.

The transient current flow from the inductive load through diode D3 and resistor 48 is sufficient to build a voltage thereacross due to the IR drop across the resistor and the forward voltage drop across the diodes. This voltage would normally cause controlled rectifier SCR3 to turn off, erroneously, if it had been only momentarily triggered On by a pulse voltage of short time period applied to winding 62. However, it is an important feature of the present invention that the square wave triggering voltage applied to the input of transformer T1 across terminals 54, 56 is of a selected duration, sufficient to maintain the On controlled rectifiers (SCR2 and SCR3 in this illustration) in a conductive condition during the time that the inductive load is discharging through diodes D2, D3.

It has been found that for electric motor loads having high horsepower output and consequently large inductive load currents to be switched, frequencies as high as 240 cycles may be handled by the circuit of the present invention without allowing any of the On controlled rectifiers to be turned Off erroneously. Thus, for all practical frequencies of operation, any E.M.F. generated across diode D3 and resistor 48 will not turn Off controlled rectifier SCR3. Likewise, the same is true with respect to diodes D2 and resistor 46, diode D1 and resistor 44, and diode D4 and resistor 50, when these diodes are in a conductive state.

After controlled rectifiers SCR2 and SCR3 have been On for a short period of time, the current through the inductive load will have passed its transient peak and begun to build up in the opposite direction, inasmuch as full line voltage is now applied across load terminals 12 and 14 through controlled rectifiers SCR2 and SCR3. These controlled rectifiers will continue to conduct while the charge is accumulating in capacitors 20, 24 described above, and until the trigger voltage 74 applied to terminals 54 and 56 of transformer T1 changes polarity and once again triggers controlled rectifiers SCR1 and SCR4. However, the residual load current path is now in the direction opposite to that shown for arrow 80 so that diodes D1 and D4 are rendered conductive by the polarity of the transient voltage appearing across terminals 12 and 14, which in this case places a positive potential on terminal 12. Thus the current path for the transient load current, commencing with negative line 18, is through diode D4 and resistor 50; through diode D6 and resistor 34 and the upper half of the coil winding of inductance 30; through the load connected to terminals 12 and 14; through the lower half of the coil winding of inductance 28 and through diode D5 and resistor 32; and through diode D1 and resistor 44 to line 16.

The large current flow through inductances 28 and 30 causes a back E.M.F. to develop when the current therethrough starts to diminish, thereby generating a large peak inverse voltage across diodes D5 and D6. The initial part of the inverse voltage wave is of much greater magnitude than the main wave because of the delay characteristics of the circuit. In order to protect these diodes from such a transient voltage, there are connected in parallel with each diode, series RC circuit elements comprising resistor 36 and capacitor 38, resistor 40 and capacitor 42. These RC components will absorb the small amount of energy contained in the initial collapse of the fields of inductances 28 and 30 and thereby protect associated diodes D5 and D6 from the very short high voltage transients.

As mentioned heretofore, the function of choke inductances 28 and 30 is to isolate the two discharge circuits which include capacitors 20 and 24. Heretofore such commutating capacitors have been combined into one single capacitor. However, in the circuit of the present invention, where the discharge currents into the load are very heavy, if one single capacitor is used, one of the silicon controlled rectifiers would operate faster than the other in the bridge arms, and thus discharge the single capacitor before its opposite number was shut Off. That is, in practice, the corresponding On silicon controlled rectifiers do not shut Off together, equally and at the same time. However, choke inductances 28 and 30 present sufficient impedance between the two capacitor discharge circuits so that each one is effectively isolated from the other and therefore each is able to turn Off its respective silicon controlled rectifiers without interference from the others. The coils of inductances 28 and 30 are wound on the same core in order that transient voltages generated in the inductances will tend to cancel one another during operation of the inverter.

It will thus be seen that in accordance with the principles of the invention, a current path independent of the condition of the controlled rectifiers is provided between the output terminals of power supply 10 which allows the load current to discharge into the power supply in minimum time, during the transient switching interval after the alternating half cycle of the input triggering voltage to the controlled rectifiers has just reversed.

The function of resistors 44, 46, 48 and 50 is to limit the peak current through associated diodes D1–D4 during the transient conducting period. However, the provision of resistors 44–48 increases the transient voltage applied across the anode and cathode terminals of the associated controlled rectifiers. Therefore, the value of each resistor 44–48 must be chosen to be a compromise between limiting the maximum transient current applied to the respective diodes and the resulting maximum transient voltage applied to the respective controlled rectifiers.

The function of resistors 32, 34 is the same as that of resistors 44–48, in that they serve to limit the current flowing to associated diodes D5 and D6.

Resistors 66, 68, 70 and 72 connected in series between control electrodes of the several controlled rectifiers and associated transformer windings 58, 60, 62, 64, serve to insure equal distribution of the output square wave pulse voltage from transformer T1. It has been found that the gate impedance of the control electrodes may vary in production for different controlled rectifiers. Therefore, by providing a high resistance value for resistors 66–72 in comparison to the gate impedance of the respective controlled electrodes, any variations therebetween are "swamped out" by the comparatively high values of such resistors.

While the present invention has been described in terms of a single phase inverter, yet it will be understood that three-phase output may be secured merely by providing three embodiments of the circuit just described, each of which is connected to one of the phases of a three-phase square wave driving source.

The foregoing has described a preferred embodiment of the invention but modifications may occur to those skilled in the art without departing from the spirit of the invention, and it is to be understood that the scope of the present invention is to be limited only by the appended claims.

We claim:

1. An inverter comprising a bridge network having four legs and having power input and output terminals, a source of direct current potential connected to said power input terminals, a plurality of controlled rectifiers each having output and control electrodes, means connecting said output electrodes into the legs of said bridge network to effectively control the current flow therein, a first commutating capacitor connected between a first selected pair of said controlled rectifiers, a second commutating capacitor connected between a second selected pair of said controlled rectifiers, means connected into said bridge legs and interposed between said first and second capacitors for effectively isolating the respective discharge currents of said capacitors from each other, means connecting said control electrodes to a source of triggering signals to cause selective conduction of said controlled rectifiers, and impedances are respectively connected between said first capacitor and said first pair of controlled rectifiers and between said second capacitor and said second pair of controlled rectifiers to selectively limit the flow of discharge current from said first and second capacitors.

2. The invention defined in claim 1 wherein said impedances are air core inductors.

3. An inverter comprising a bridge network having four legs and having power input and output terminals for connection to a reactive load, a source of direct current potential connected to said power input terminals, a plurality of controlled rectifiers each having output and control electrodes, means connecting said output electrodes into the legs of said bridge network to effectively control the current flow therein, a first commutating capacitor connected between a first selected pair of said controlled rectifiers, a second commutating capacitor connected between a second selected pair of said controlled rectifiers, means connected into said bridge legs and interposed between said first and second capacitors for effectively isolating the respective discharge currents of said capacitors from each other, means connecting said control electrodes to a source of triggering signals to cause selective conduction of said controlled rectifiers, and means operative to substantially reduce the impedance of said isolating means to the flow of transient, reactive load current therethrough whenever said controlled rectifiers are triggered into a conducting state.

4. An inverter comprising a bridge network having four legs and having power input and output terminals, a source of direct current potential connected to said power input terminals, a plurality of controlled rectifiers each having output and control electrodes, means connecting said output electrodes into the legs of said bridge network to effectively control the current flow therein, a first commutating capacitor connected between a first selected pair of said controlled rectifiers, a second commutating capacitor connected between a second selected pair of said controlled rectifiers, at least a pair of inductors respectively coupling first and second selected pairs of said bridge legs and interposed between said first and second capacitors for effectively isolating the respective discharge currents of said capacitors from each other, means connecting said control electrodes to a source of triggering signals to cause selective conduction of said controlled rectifiers, and said output terminals are connected to the coil windings of said inductors at points other than the end terminals thereof.

5. The invention defined in claim 4 wherein each of said inductors has an asymmetric impedance connected in parallel therewith and a conduction relationship with said inductors effective to substantially reduce the generation of transient potentials by said inductors whenever the current flow therein is being varied.

6. The invention defined in claim 4 wherein said inductors have a common core and coil windings thereon connected in said bridge legs with a polarity effective to substantially cancel transient potentials developed by said inductors.

7. An inverter comprising a bridge network having four legs and having first and second power input terminals each defining first and second junction points between a first and second pair of said legs, a source of direct current potential connected to said power input terminals, a plurality of controlled rectifiers each having an anode, a cathode and a control electrode, means connecting said anodes and cathodes of said controlled rectifiers into the legs of said bridge network, said anodes of a first pair of said controlled rectifier being connected to said first input terminal, said cathodes of a second pair of said controlled rectifiers being connected to said second input terminal, a first commutating capacitor connected between the cathodes of said first pair of controlled rectifiers, a second commutating capacitor connected between the anodes of said second pair of controlled rectifiers, a pair of inductors each serially connected between the cathodes of said first pair of controlled rectifiers and the anodes of said second pair of controlled rectifiers to interconnect said first and second pairs of said legs, each of said inductors having an output terminal for connecting a load device therebetween, said inductors being effective to electrically isolate the discharge currents of said first and second commutating capacitors from each other, a first plurality of diodes each connected across a respective anode and cathode of one of said controlled rectifiers and in opposing conductivity relationship therewith, a second plurality of diodes each connected across a respective one of said inductors in serially aiding conductivity relationship with said first plurality of diodes, and transformer means having output windings connecting said control electrodes to a source of triggering signals, said transformer output windings having a phase relationship effective to sequentially trigger into conduction, selected controlled rectifiers from each pair of said rectifiers, said first and second plurality of diodes being operative to provide a by-pass path for the flow of transient, reactive load current around said conducting controlled rectifiers and at least a portion of the windings of said inductors whenever said selected controlled rectifiers are triggered into a conducting state.

References Cited by the Examiner

UNITED STATES PATENTS

| 3,074,030 | 1/1963 | Hierholzer | 321—45 X |
| 3,103,616 | 9/1963 | Cole et al. | |
| 3,185,912 | 5/1965 | Smith et al. | 321—18 |
| 3,210,638 | 10/1965 | Walker | 321—45 |
| 3,257,604 | 6/1966 | Colclaser et al. | 321—45 |

JOHN F. COUCH, *Primary Examiner.*

W. M. SHOOP, *Assistant Examiner.*